| United States Patent [19] | | [11] | 4,271,214 |
|---|---|---|---|
| Miki et al. | | [45] | Jun. 2, 1981 |

[54] METHOD FOR RECOVERING ACRYLIC RESIN FROM EXCESS OF SPRAYED POWDER COATING COMPOSITION BY USING AROMATIC SOLVENTS

[75] Inventors: Katsuo Miki, Oomiya; Kazutoshi Abe, Yokohama, both of Japan

[73] Assignee: Nippon Paint Co., Ltd., Osaka, Japan

[21] Appl. No.: 70,585

[22] Filed: Aug. 29, 1979

[30] Foreign Application Priority Data

Sep. 7, 1978 [JP] Japan ................................ 53-109117

[51] Int. Cl.³ .............................................. B08B 3/08
[52] U.S. Cl. .................................... 427/345; 134/38
[58] Field of Search ................ 427/195, 345; 118/312, 118/326; 210/21, 22; 134/38

[56] References Cited

U.S. PATENT DOCUMENTS

| 3,179,609 | 4/1965 | Morison | 134/38 X |
|---|---|---|---|
| 3,714,926 | 2/1973 | Ofner | 118/312 X |
| 3,737,386 | 6/1973 | Geiss et al. | 134/38 X |
| 3,975,208 | 8/1976 | Tate et al. | 134/38 X |
| 4,024,815 | 5/1977 | Platsch | 118/312 X |

*Primary Examiner*—Frank A. Spear, Jr.
*Attorney, Agent, or Firm*—Ladas & Parry

[57] ABSTRACT

Disclosed is a method for recovering acrylic resin from an excess of a sprayed powder coating composition. An excess of the powder coating composition which is not deposited onto an article to be coated and is recovered in a coating apparatus is dissolved in an aromatic hydrocarbon solvent which dissolves the acrylic resin component and which has a solubility of a curing agent of not more than 1.0 g (curing agent)/100 g (solvent) at 20° C. and the acrylic resin component is recovered from the resin solution. The acrylic resin component thus recovered can be reused as a resin component for coating compositions.

5 Claims, No Drawings

METHOD FOR RECOVERING ACRYLIC RESIN FROM EXCESS OF SPRAYED POWDER COATING COMPOSITION BY USING AROMATIC SOLVENTS

The present invention relates to a method for recovering a resin component from a powder coating composition containing the same. More specifically, it relates to a method for recovering a resin component from an excess of a sprayed powder coating composition containing a resin component, a pigment and a curing agent, which is not deposited onto an article to be coated and is recovered in an apparatus for coating an article with a powder coating composition. The recovered resin component is reused as a resin component for a coating composition.

There has been considerable interest in recent years directed toward the use of powder coating compositions. Such interest is based on the facts that coating films having excellent properties can be obtained by the use of polymer substances or resins and the use of the powder coating composition is advantageous from the pollutional points of view because no solvent is used in any coating steps.

However, some of the powder coating composition is not deposited onto the article. When the powder coating composition is sprayed onto an article to be coated from a spray gun, generally the sprayed powder coating composition that is deposited onto the article is within the range of from 60 to 70% by weight, although it depends upon the form and structure of the article to be coated. Thus, 30 to 40% by weight of the powder coating composition falls down into the apparatus. In order to collect and reuse this excess of the powder coating composition, various attempts have been made. However, such attempts still have problems which should be solved. These problems are that moisture is contained in the recovered excess powder coating composition, foreign materials such as dust, paper, metals or the like contaminate the excess powder coating composition and powder coating compositions having different colors become mixed with each other when powder coating compositions are changed from a certain color to another color. Particularly, the color mixing of the powder coating composition inevitably occurs when excess powder coating compositions are recovered. Thus, the recovered excess coating compositions are generally, for example, incinerated, except for a small amount of the recovered excess powder coating composition which is reused as a coating composition having a dark color.

Accordingly, an object of the present invention is to obviate the above-mentioned problems of the recovery of the excess powder coating composition and to provide a method for recovering a resin component from the excess powder coating composition which is generated in a large amount from a powder coating system and for reusing the recovered resin component as a resin component for coating compositions.

Other objects and advantages of the present invention will be apparent from the following description.

In accordance with the present invention, there is provided a method for recovering a resin component from an excess of a sprayed powder coating composition containing a resin component, a pigment and a curing agent which is not deposited onto an article to be coated and is recovered in an apparatus for coating an article with a powder coating composition comprising the steps of:

(a) dissolving the excess powder coating composition in an organic solvent which can dissolve the resin component of the powder coating composition and which organic solvent has a solubility of the curing agent of not more than 1.0 g (curing agent)/100 g (solvent) at 20° C., (b) separating insoluble or non-dissolved components including the pigment and the curing agent from the resin solution obtained in step (a); and (c) removing the organic solvent from the resin solution to thereby recover the resin component. The recovered resin component can be reused as a resin component for coating compositions.

In accordance with the present invention, there is also provided a method for recovering a resin component from an excess of a sprayed powder coating composition containing a resin component, a pigment and a curing agent which is not deposited onto an article to be coated and is recovered in an apparatus for coating an article with a powder coating composition, comprising the steps of:

(a) treating the excess powder coating composition with an organic solvent having a solubility of the curing agent of not less than 5 g (curing agent)/100 g (solvent) at 20° C. and having a solubility of the resin component of not more than 1 g (resin component)/100 g (solvent) at 20° C., whereby the curing agent is removed from the excess powder coating composition, (b) dissolving the resultant excess powder coating composition in an organic solvent which can dissolve the resin component of the excess powder coating composition, (c) separating insoluble or non-dissolved components including the pigment from the resin solution obtained in step (b); and (d) removing the organic solvent from the resin solution to thereby recover the resin component. The recovered resin component can be reused as a resin component for coating compositions.

As mentioned above, in an apparatus for spraying powder coating compositions, approximately 60 to 70% by weight of powder coating compositions which are sprayed from a spray gun are deposited onto articles to be coated and approximately 30 to 40% by weight of the powder coating compositions are not deposited onto the articles and are recovered as excess powder coating compositions. The recovery of the excess powder coating compositions is carried out in dry processes and wet processes. For example, in the dry processes, excess powder coating compositions are collected by means of air exhaust streams in dry type paint spray booths and, then, are isolated from the air streams by cyclones or the like. Alternatively, in wet type paint spray booths, excess powder coating compositions are collected by means of a water wash and then separated from the water.

Since the excess powder coating compositions thus recovered are generally of a variety of colors and are contaminated with dust and other foreign materials, it is usually difficult to reuse the recovered coating compositions as they are. However, in accordance with the present invention, a resin component contained in the recovered excess powder coating composition is dissolved in an organic solvent and is separated from the pigment, the curing agent and other insoluble components. From the resultant resin solution, the organic solvent is evaporated and the resin component is recovered. The resin component thus recovered may be reused as a resin component for powder coating compositions as well as other coating compositions. However, the present inventors have found that, when a curing agent contained in the powder coating composition is present in the recovered resin solution, a curing or crosslinking reaction occurs during, for example, the heating when the solvent is vaporized from the resin solution and, as a result, the molecular weight of the recovered resin increases and, in an extreme case, the recovered resin cannot be used as a coating resin due to the gellation of the recovered resin.

For this reason, in accordance with the first aspect of the present invention, an organic solvent or solvents which dissolve the resin component of the powder coating composition and which has a solubility of the curing agent of not more than 1.0 g (curing agent)/100 g (solvent) at 20° C., preferably of not more than 0.1 g (curing agent)/100 g (solvent) at 20° C. is used as a solvent for dissolving the resin component in the excess powder coating component. In the case where a solvent having a solubility of more than 1.0 g (curing agent)/100 g (solvent) is used, the amount of the curing agent dissolved in the solvent is disadvantageously increased. Although the solvents which can be used in the present invention depend upon types of resins to be recovered and types of curing agents contained in excess powder coating compositions, it should be noted that the selection of such solvents can be easily made by those skilled in the art in accordance with, for example, repeated experiments. Examples of the combinations of resins, curing agents and solvents which can be used in the present invention are illustrated in the following Table A. However, it should be noted that the present invention is not intended to be limited by these specific combinations. These solvents can be used alone or any combination thereof.

TABLE A

1. Acrylic Resin

| Curing Agent | Solvent |
| --- | --- |
| Dicarboxylic acids such as 1,10-decane dicarboxylic acid, 1,12-dodecane dicarboxylic acid and the like. | Aromatic solvents such as toluene, xylene and the like; ketones such as acetone, methyl ethyl ketone, methyl isobutyl ketone and the like; esters such as methyl acetate, ethyl acetate, butyl acetate and the like. |
| Melamine resins | Xylene |
| Epoxy resins | Aromatic solvents such as toluene, xylene and the like; halogenated hydrocarbons such as chlorobutane and the like. |

2. Polyester Resin

| Curing Agent | Solvent |
| --- | --- |
| Epoxy resins | Cellosolves such as methyl cellosolve, ethyl cellosolve, butyl cellosolve and the like; ethylene glycol monomethyl ether acetate, diacetone alcohol, dimethyl formamide, dimethyl sulfoxide, γ-butyro lactone, propylene carbonate, carbitol acetate. |

3. Epoxy Resins

| Curing Agent | Solvent |
| --- | --- |
| Dicyandiamide | Esters such as ethylacetate, butyl acetate and the like; ketones such as methyl ethyl ketone, cyclohexanone and the like; ethers such as tetrahydrofuran, dioxane and the like; halogenated hydrocarbons such as trichloroethylene, chloroform and the like. |
| Dicarboxylic acid | Esters such as ethylacetate, butyl acetate and the like; ketones such as methyl ethyl ketone, cyclohexanone and the like; ethers such as tetrahydrofuran, dioxane and the like; halogenated hydrocarbons such as trichloroethylene, chloroform and the like. |
| Dihydrazide | Esters such as ethylacetate, butyl acetate and the like; ketones such as methyl ethyl ketone, cyclohexanone and the like; ethers such as tetrahydrofuran, dioxane and the like; halogenated hydrocarbons such as trichloroethylene, chloroform and the like. |
| Acid anhydrides | Esters such as ethylacetate, butyl acetate and the like; ketones such as methyl ethyl ketone, cyclohexanone and the like; halogenated hydrocarbons such as trichloroethylene, chloroform and the like. |

When the resin component contained in the recovered excess powder coating composition is dissolved in the solvent, the amount of the solvent is not specifically limited. However, since the amount of the curing agent which is dissolved in the solvent should be minimized and also in view of the simple operation in the separation step and the cost of the solvent removal step, a preferable concentration of the resin in the recovered resin solution is 10% by weight or more, and more preferably, within the range of from 10 to 30% by weight. The resin solution thus obtained is optionally passed through a screen having a Tyler sieve of approximately 60 through 325 mesh to remove foreign materials having a large size from the recovered resin solution and, then, insoluble substances such as pigments, curing agents and the like are removed from the resin solution by means of, for example, centrifugation, filtration (e.g. sand filtration, ultrafiltration and other conventional filtration) and the like.

The organic solvent can be removed from the resin solution thus obtained by using, for example, a film evaporator, a dryer, a screw evaporator, a dry spray and the like. Thus, the resin component having a solid content of 98% by weight or more can be recovered. Since the properties of the resin thus obtained are substantially the same as those of the original resin and since the resin is not contaminated by color, the resin can be reused as a resin component for powder coating compositions as it is. This resin can also be used for the production of, for example, a solvent type coating composition and a water slurry type coating composition, so far as the properties of the original resin permit.

The solid resin recovered from the excess powder coating composition in accordance with the present invention can be compounded into a powder coating composition, together with a curing agent and, optionally, a pigment and other additives such as a leveling agent, a curing accelerator, an antistatic agent and the like in accordance with any conventional method.

If necessary, after the separation of the resin component, a curing agent can be recovered from a residue containing a curing agent, a pigment and the like, by using an appropriate solvent.

In accordance with the second aspect of the present invention, a solvent or solvents having a solubility of the curing agent of not less than 5 g (curing agent)/100 g (solvent) at 20° C. and more preferably of not less than 10 g/100 g and having a solubility of the resin component of not more than 1 g (resin component)/100 g (solvent) at 20° C. and, more preferably, of not more than 0.5 g/100 g at 20° C. are used as a first solvent for removing a curing agent from an excess powder coating composition. If necessary, a curing agent can be recovered from the resultant curing agent solution and reused as a curing agent for use in the production of coating compositions.

The resultant powder coating composition is then treated with a second solvent which dissolves a resin component contained in the resultant excess powder coating composition. Thus, the resin component is isolated from pigments and other insoluble substances. The resin component can be recovered from the resin solution in accordance with the method as mentioned in the first aspect of the present invention and can be reused as a resin component for coating compositions.

The method according to the second aspect of the present invention is particularly suitable for use in the recovery of a resin component from such a resin-curing agent system wherein a solvent which does not dissolve the curing agent but dissolves the resin component is not easily available. Furthermore, in the case of a resin-curing agent system containing at least two curing agents, different curing agents can be separately recovered from excess powder coating compositions by the combined use, in any order, of the first and second aspects of the present invention.

In the case where the first solvent has a solubility of the curing agent of less than 5 g/100 g or a solubility of the resin component of more than 1 g/100 g, an amount of the curing agent incorporated into the recovered resin component or a loss of the resin component is disadvantageously increased. Although the solvents which can be used as the first solvent in the second aspect of the present invention depend upon types of the particular resin-curing agent system, it should be noted that the selection of the first solvent can be easily made by those skilled in the art in accordance with, for example, repeated experiments. Examples of such combinations of resin-curing agent-solvent are illustrated in the following Table B. However, it should be noted that the present invention is by no means limited by these specific combinations.

TABLE B

| Resin | Curing Agent | Solvent |
|---|---|---|
| Acrylic resin | Dicarboxylic acids | Alcohols such as methanol, ethanol and the like. |
| | Melamine resins | Alcohols such as methanol, ethanol and the like. |
| | Blocked isocyanates | Alcohols such as methanol, ethanol and the like. |
| Polyester resin | Melamine resins | Alcohols such as methanol, ethanol and the like |
| | Blocked isocyanates | Alcohols such as methanol, ethanol and the like; aromatic solvents such as toluene xylene and the like |

Solvents which can be used, as a second solvent, for separating a resin component from a pigment and the like contained in the resultant excess powder coating composition from which the curing agent is removed, include any organic solvents which can dissolve the particular resin component (since the pigment is not dissolved in organic solvents). Examples of such solvents are also illustrated in the following Table C.

TABLE C

| Resin | Solvent |
|---|---|
| Acrylic resins | Aromatic solvents such as toluene, xylene and the like; ketones such as acetone, methyl ethyl ketone, methyl isobutyl ketone; esters such as methyl acetate, ethyl acetate, butyl acetate and the like; cellosolves such as methyl cellosolve, ethyl cellosolve and the like; ethers such as tetrahydrofuran, dioxane and the like |
| Polyester resins | Cellosolves such as methyl cellosolve, ethyl cellosolve and the like; ethyleneglycol monomethylether acetate; diacetone alcohol; dimethylformamide; dimethyl sulfoxide; tetrahydrofuran; dioxane; cyclohexanone; |
| Epoxy resins | Esters such as ethyl acetate, butyl acetate and the like; ketones such as methyl ethyl ketone, cyclohexanone and the like; ethers such as tetrahydrofuran, dioxane and the like; halogenated hydrocarbons such as trichloroethylene, chloroform and the like |

Although the amount of the solvent is not specifically limited, a preferable concentration of the resin in the recovered resin solution is 10% by weight or more, and more preferably, within the range of from 10 to 30% by weight, in view of the simple operation in the separation step and the cost of the solvent removal step.

Powder coating compositions to which the present invention can be applied includes, for example, thermosetting type resins such as epoxy resins, acrylic resins, polyesters resins and the like, which are not self-crosslinking type thermosetting resins. The preferable powder coating compositions are those in which a chemical reaction between a resin and a curing agent does not occur during the storage period of the powder coating composition. Examples of such powder coating compositions are epoxy type powder coating compositions containing, as a curing agent, dicyandiamide or acid dihydrazide; polyester type powder coating compositions containing, as a curing agent, blocked isocyanates; acrylic type powder coating compositions containing, as a resin component, acrylic resins which are produced without using a chain transfer agent such as tert-dodecyl mercaptan.

The invention is now illustrated by, but is not limited to, the following examples in which all parts and percentages are expressed on a weight basis unless otherwise specified.

EXAMPLE 1

The components illustrated in Table 1 below were dry blended with each other in a supermixer and then were melt-blended or kneaded at 100° C. by using an extruder, Ko-Kneader ® PR-46 (Buss Ltd. Swithzerland). The blended composition was then ground to a fine powder, after air cooling, by using a hummer mill. The powder was then passed through a sieve having a size of 150 mesh (Tyler). Thus, acrylic powder coating composition A was prepared.

TABLE 1

| Component | Part |
|---|---|
| Acrylic resin [a]*[1] | 100 |
| 1,10-decane dicarboxylic acid (curing agent) | 12 |
| titanium dioxide | 30 |
| Moda Flow ®*[2] | 1 |

*[1]Acrylic copolymer having a weight-average molecular weight of 18000 which was prepared by the conventional suspension polymerization of 15 parts of glycidyl methacrylate, 40 parts of methyl methacrylate, 15 parts of butyl methacrylate, 30 parts of styrene, 2 parts of azobisisobutyronitrile (a polymerization initiator) and 2 parts of t-dodecyl mercaptan (a chain transfer agent) at 80° C.
*[2]Leveling Agent (Monsanto Chemical Co., LTD.)

This acrylic powder coating composition A was statically sprayed in a dry type spray booth provided with a cyclone as a recovery device, and an excess of the sprayed powder coating composition was recovered by the cyclone. From the recovered excess coating composition, an acrylic resin was recovered by separately using the following six solvents.

| Solvent | Solubility of 1,10-decane dicarboxylic acid |
|---|---|
| (1) toluene | 0.005 g/100 g |
| (2) xylene | 0.005 g/100 g |
| (3) ethyl acetate | 0.58 g/100 g |
| (4) methyl isobutyl ketone | 0.71 g/100 g |
| (5) tetrahydrofuran | 5.4 g/100 g |
| (6) ethyl cellosolve | 6.5 g/100 g |

The resin was recovered as follows: Into 25 parts of the recovered excess acrylic powder coating composition, 100 parts of the solvent was added, and then the mixture was dissolved and dispersed for 1 hour with stirring in a vessel. The dissolved dispersion was then passed through a sieve having a size of 150 mesh (Tyler) to thereby remove foreign matter therefrom, and then was filtered by using diatomaceous earth to remove insoluble matter. Thus, a clear resin solution was obtained. By analyzing the acid number of the clear resin solution thus obtained, the residual amount of the 1,10-decane dicarboxylic acid in the clear solution was determined. The results are shown in Table 2 below.

The solvent was removed from the clear resin solution at a temperature of 160° C. under a reduced pressure of 30 mm Hg for 30 minutes by using a rotary evaporator, whereby the solid resin was obtained. The molecular weight of the solid resin thus obtained was determined. The results are shown in Table 2 below.

By using the recovered solid resin in lieu of the acrylic resin [a] in the composition shown in Table 1, a powder coating composition was prepared in a manner similar to that of the acrylic powder coating composition A. The powder coating composition thus prepared was statically coated onto a SPC-1 steel plate having a width of 0.8 mm which was subjected to a zinc phosphate conversion coating, by using an electrostatic powder gun. The plate was then baked for 20 minutes at a temperature of 180° C. The appearance of the resulting film was compared to that of the film obtained from the acrylic powder coating composition A. The results are shown in Table 2 below.

As is clear from the results shown in Table 2 below, the lower the solubility of 1,10-decane dicarboxlic acid in the solvent used, the better the resin that can be recovered.

TABLE 2

| Solvent | Acid Number of Clear Solution | Weight-Average M.W. of Recovered Resin | Appearance*[1] of Film |
|---|---|---|---|
| (1) Toluene | 0.3 | 19000 | identical |
| (2) Xylene | 0.3 | 19000 | identical |
| (3) Ethyl acetate | 2.1 | 25000 | similar |
| (4) Methyl isobutyl ketone | 2.5 | 26000 | similar |
| (5) Tetrahydrofuran | 9.5 | gel (not determined) | different (poor) |
| (6) Ethyl cellosolve | 9.4 | gel (not determined) | different (poor) |

*[1]The appearance was determined with the naked eye in comparison with the acrylic powder coating composition A.

EXAMPLE 2

Powder coating compositions B and C, having the compositions shown in Table 3 below, were prepared in the manner as described in Example 1.

TABLE 3

| Component | Acrylic Powder Coating Composition B (part) | Polyester Powder Coating Composition C (part) |
|---|---|---|
| Acrylic resin [b]*[1] | 100 | — |
| Polyester resin*[2] | — | 80 |
| Blocked Isocyanate*[3] | 50 | 20 |
| Titanium dioxide | 40 | 40 |
| Red iron oxide*[4] | 4 | 4 |
| Moda Flow ® | 1 | — |
| Acronal 4F*[5] | — | 1 |

*[1]Acrylic copolymer having a weight-average molecular weight of 19,000 which was prepared by the conventional suspension polymerization of 20 parts of 2-hydroxyethyl methacrylate, 30 parts of methyl methacrylate, 18 parts of butyl methacrylate, 30 parts of styrene, 2 parts of acrylic acid, 2 parts of azobisisobutyronitrile (a polymerization initiator) and 2 parts of t-dodecyl mercaptan (a polymerization initiator) and 2 parts of t-dodecyl mercaptan (a chain transfer agent) at 80° C.
*[2]Crelan U-502 (Bayer)
*[3]Crelan Crosslinking Agent U-1 (Bayer)
*[4]Tenyo Bengara 501 (Tone Sangyo Co.)
*[5]Leveling Agent (BASF)

The powder coating compositions B and C were separately sprayed in a dry type spray booth, and excess powder coating compositions were recovered by a cyclone. 30 parts of the excess acrylic powder coating composition B thus recovered was dissolved in 100 parts of xylene. On the other hand, 35 parts of the recovered excess polyester powder coating composition C was dissolved in 100 parts of dioxane.

These liquids were centrifuged for 30 minutes at 1500 rpm, whereby the pigment and other insoluble matter settled. The supernatant liquids were recovered. After adjusting the solid concentrations of the supernatant liquids to the values shown in the following Tables, methanol was added to the liquids in the amounts shown in the Table below.

TABLE

Recovered Polyester Powder Coating Composition B

| No. | Solid Conc. (%) of Supernatant Liq. | Addition Amount of Methanol (part) | Ratio of Xylene/Methanol | Solubility of Resin*[1] |
|---|---|---|---|---|
| 7*[2] | 30 | 70 | 50/50 | more than 10 g/100 g |
| 8 | 40 | 100 | 30/50 | 0.5 g/100 g |

TABLE-continued

Recovered Polyester Powder Coating Composition B

| No. | Solid Conc. (%) of Super- natant Liq. | Addition Amount of Methanol (part) | Ratio of Xylene/Methanol | Solubility of Resin*1 |
|---|---|---|---|---|
| 9 | 50 | 150 | 25/75 | 0.3 g/100 g |

*1 Acrylic resin [b]
2 Comparative Example

TABLE

Recovered Polyester Powder Coating Composition C

| No. | Solid Conc. (%) of Super- natant Liq. | Addition Amount of Methanol (part) | Ratio of Dioxane/Methanol | Solubility of Re- sin*1 |
|---|---|---|---|---|
| 10*2 | 30 | 35 | 40/20 | more than 10 g/100 g |
| 11 | 40 | 60 | 50/50 | 0.2 g/100 g |
| 12 | 50 | 100 | 20/40 | 0.1 g/100 g |

*1 Crelan U-502 (Weight Average M.W. = 20,000) *2 Comparative Example

These liquids were centrifuged for 30 minutes at 1500 rpm, whereby the resin components were precipitated. After the supernatant liquids were taken off, methanol was added thereto. The liquids were again centrifuged for 30 minutes at 1500 rpm. The supernatant liquids were taken off.

The solvents were removed from the precipitates by heating the precipitates at 160° C. for 1 hour. Thus, recovered resins were obtained. By using these recovered resins, powder coating compositions having the same composition as in Table 3 were prepared in the manner as described above. The coating compositions thus prepared were sprayed under conditions similar to those of Example 1 and the appearance of the resulting films was observed with the naked eye. The results are shown in Table 4 below.

TABLE 4

| Run No. | 7*1 | 8 | 9 | 10*1 | 11 | 12 |
|---|---|---|---|---|---|---|
| Weight-Average M.W. of Recovered Resin | not recovered | 19,000 | 20,000 | not recovered | 21,000 | 20,000 |
| Appearance of Powder Coating Composition con- taining Recovered Resin | — | identical | identical | — | identical | identical |

*1 Comparative Example

EXAMPLE 3

Powder coating composition D, having the compositions shown in Table 5 below, was prepared in the manner as described in Example 1.

TABLE 5

| Component | Part |
|---|---|
| Epoxy resin*1 | 100 |
| Dicyandiamide | 6 |
| Titanium dioxide | 30 |
| Moda Flow$^R$ | 1 |

*1 Epikote 1004 (Shell Kagaku, Japan)

The epoxy powder coating composition D was sprayed in a dry type spray booth, and an excess powder coating composition was recovered by a cyclone. The resin was recovered from the excess powder coating composition by using the following four solvents in a manner similar to using the following four solvents in a manner similar to that described in Example 1.

| Solvent Used | Solubility of Dicyandiamide |
|---|---|
| (13) Methyl isobutyl ketone | 0.2g/100g |
| (14) Butyl acetate | 0.15g/100g |
| (15) Methylene chloride | 0.2g/100g |
| (16) Methyl cellosolve | 7.8g/100g |

By using the recovered solid resin in lieu of the epoxy resin shown in Table 5, powder coating composition having the composition shown in Table 5 were prepared in the manner as described above. The powder coating compositions thus prepared were coated in the manner as described in Example 1 and then baked for 20 minutes at a temperature of 200° C. to form coating films. The appearance of the resulting films was determined, in comparison with that of the epoxy powder coating composition D, with the naked eye. The results are shown in Table 6 below.

TABLE 6

| No. | 13 | 14 | 15 | 16*1 |
|---|---|---|---|---|
| Solvent used | Methyl isobutyl ketone | Butyl acetate | Meth- ylene chloride | Methyl cello- solve |
| Weight Average M.W. of Recovered Resin*2 | 2100 | 2100 | 2200 | gel (not de- termined) |
| Appearance of Film*3 of Coating Composition Containing Recovered Resin | identical | identi- cal | identical | different (poor) |

*1 Comparative Example
*2 Epikote 1004 = 2100
*3 In comparison with the powder coating composition D

EXAMPLE 4

An acrylic powder coating composition E having the compositions shown in Table 7 was prepared in a manner similar to that described in Example 1.

TABLE 7

| Component | Part |
|---|---|
| Acrylic resin [b]*1 | 100 |
| Melamine resin*2 | 15 |
| Titanium dioxide | 30 |
| Moda Flow ® | 1 |

*1 See Example 2
*2 Cymel 303 (Mitui Toatsu Chemicals Inc.)

The acrylic powder coating composition E was sprayed in a dry type spray booth, and an excess sprayed powder coating composition was recovered by a cyclone. Into 30 parts of the recovered excess powder coating composition, 100 parts of xylene (having a solubility of the melamine resin of 0.8 g/100 g) was added.

The resultant mixture was centrifuged for 30 minutes at 2500 rpm, whereby the insoluble matters such as the pigment and the curing agent, settled. Thus, the supernatant liquid (i.e. resin solution) was taken off.

The recovered resin solution thus obtained was dried at a temperature of 160° C. under 30 mmHg for 1 hour to thereby recover solid resin having a nonvolatile content of 99.2%. The weight-average molecular weight of the recovered resin was 20,000.

By using the recovered resin in lieu of the acrylic resin B in the composition shown in Table 7, a powder coating composition was prepared in the manner as described above. The powder coating composition thus obtained was coated and baked in the manner as described in Example 1. The appearance of the resulting film was essentially identical to that of the original acrylic powder coating composition E.

EXAMPLE 5

A polyester powder coating composition F having the compositions shown in Table 8 was prepared in a manner similar to that described in Example 1.

TABLE 8

| Component | Part |
| --- | --- |
| Polyester resin*[1] | 80 |
| Melamine resin*[2] | 8 |
| Titanium Dioxide | 30 |
| Acronal 4F*[1] | 1 |

*[1]See Example 2
*[2]See Example 4

The polyester powder coating composition F was sprayed in a dry type spray booth, and an excess of the sprayed coating composition was recovered by a cyclone. Into 30 parts of the recovered excess powder coating composition, 100 parts of ethanol having a solubility of the polyester resin of 0.04 g/100 g was added as a solvent for the curing agent.

The resulting mixture was centrifuged for 30 minutes at 2500 rpm, whereby the insoluble matter, such as the pigment and the resin, settled. The insoluble matter was taken off. Into 25 parts of the insoluble matter thus obtained, 100 parts of dioxane (i.e. a solvent for the resin) was added, and the resin was dissolved in the solvent. The liquid mixture was then passed through a diatomaceous earth layer to thereby remove the pigment, and a clear supernatant liquid containing the polyester resin was obtained.

The recovered resin solution of the polyester powder coating composition thus obtained was dried at a temperature of 160° C. for 1 hour under 30 mmHg. Thus, a solid resin having an nonvolatile content of 99.2% was recovered. The weight-average molecular weight of the recovered resin was 27,000.

By using the recovered resin in lieu of the original polyester resin in the composition shown in Table 8, a powder coating composition was prepared in the manner as described above. The powder coating composition thus obtained was coated and baked in a manner as described in Example 1. The appearance of the resulting film was essentially identical to that of the original powder coating composition F.

EXAMPLE 6

An acrylic powder coating composition G having compositions shown in Table 9 was prepared in a manner similar to that described in Example 1.

TABLE 9

| Components | Part |
| --- | --- |
| Acrylic resin[a]*[1] | 100 |
| 1,10-decane dicarboxylic acid | 12 |
| Adduct B-1065*[2] | 5 |
| Titanium dioxide | 30 |
| Red iron oxide*[1] | 2 |
| Moda Flow ®*[1] | 1 |

*[1]See Example 1
*[2]Blocked isocyanate (Veba Chemie)

This acrylic powder coating composition G was sprayed in a dry type spray booth, and an excess of the sprayed powder coating composition was recovered by a cyclone. 30 parts of the recovered excess sprayed powder coating composition G was dissolved into 100 parts of toluene. The mixture was then passed through a diatomaceous earth filter layer to thereby remove the pigments and 1,10-decane dicarboxylic acid. The acid number of the filtrate was 0.2. This value shows the fact that a substantial amount of the 1,10-decane dicarboxylic acid could be removed. The nonvolatile matter of the filtrate was 21.9%.

Into 100 parts of the filtrate thus obtained, 150 parts of methanol was added and the acrylic resin was precipitated. The mixture was centrifuged for 30 minutes at 1500 rpm. The supernatant liquid was taken off. 50 parts of methanol was further added to the resultant precipitate and the precipitate was washed with methanol. Thereafter, the mixture was again centrifuged for 30 minutes at 1500 rpm. The supernatant liquid was taken off.

The precipitate was heated at a temperature of 170° C. for 30 minutes under a reduced pressure of 25 mmHg. Thus, a recovered solid resin having a nonvolatile matter of 99.3% was obtained. The weight-average molecular weight of the recovered resin was 19,000.

By using the recovered resin in lieu of the original acrylic resin [a] in the composition shown in Table 9, a powder coating composition was prepared in the manner as described above. The powder coating composition thus obtained was coated and baked in the manner as described in Example 1. The appearance of the resulting film was essentially identical to that of the original acrylic powder coating composition G.

EXAMPLE 7

Powder coating compositions H,I,J, and K having the compositions shown in Table 10 were prepared in the manner as described in Example 1.

TABLE 10

| | Powder Coating Composition (parts) | | | |
| --- | --- | --- | --- | --- |
| Component | H | I | J | K |
| Acrylic resin [c]*[1] | 100 | — | — | — |
| Acrylic resin[d]*[2] | — | 100 | — | — |
| Acrylic resin[e]*[3] | — | — | 100 | — |
| Acrylic resin[f]*[4] | — | — | — | 100 |
| 1,10-decane dicarboxylic acid | 12 | 24 | 12 | 24 |
| Titanium dioxide | 30 | 30 | 30 | 30 |

TABLE 10-continued

| Component | Powder Coating Composition (parts) | | | |
|---|---|---|---|---|
| | H | I | J | K |
| Moda Flow ®*5 | 1 | 1 | 1 | 1 |

*1 Acrylic copolymer having a weight-average molecular weight of 20,000 which was prepared by solution polymerizing a mixture of 15 parts of glycidyl methacrylate, 40 parts of methylmethacrylate, 15 parts of butyl methacrylate, 30 parts of styrene, 2 parts of azobisisobutyronitrile and 100 parts of xylene at a temperature of 120° C. for 7 hours under a nitroen atmosphere and then removing the solvent from the a mixture at a temperature of 160° C. under a pressure of 30 mmHg.
*2 Acrylic copolymer having a weight-average molecular weight of 19,000 which was prepared from 30 parts of glycidyl methacrylate, 30 parts of methyl methacrylate, 5 parts of butyl methacrylate, 30 partsof styrene, 5 parts of ethyl acrylate, 2 parts ofazobisisobutyronitrile and 100 parts of xylene in themanner as described in the preparation of the acrylicresin [c].
*3 Acrylic copolymer having a weight-average molecular weight of 21,000 which was prepared by a suspensionpolymerization of a mixture of 15 parts of glycidylmethacrylate, 40 parts of methyl methacrylate, 15parts of butyl methacrylate, 30 parts of styrene, 2 partsof azobisisobutyronitrile and 2 parts oft-dodecyl mercaptan at a temperature of 75° C. for5 hours.
*4 Acrylic copolymer having a weight-average molecularweight of 21,000 which was prepared by a suspensionpolymerization of a mixture of 30 parts of glycidylmethacrylate, 30 parts of methyl methacrylate, 5parts of butyl methacrylate, 30 parts ofstyrene, 5parts of ethyl acrylate, 2 parts of azobisisobutyroni-trile and 2 parts of t-dodecyl mercaptan at atemperature of 75° C. for 5 hours.
*5 See Example 1

After the acrylic powder coating compositions H through K were stored in a constant temperature room of 35° C. for 6 months, 100 parts of xylene was added to 30 parts of the powder coating composition and the mixture was dissolved and dispersed for 1 hour with stirring by using a disper. The resulting mixture was filtered by using a diatomaceous earth to remove any insoluble matter from the mixture. Thus, a clear resin solution was obtained. The weight-average molecular weight of the recovered resin contained in the clear resin solution was determined. The results are shown in Table 11 below.

The resin solution was heated at a temperature of 160° C. for 30 minutes under a reduced pressure of 30 mmHg in a rotary evaporator to remove the solvent from the solution. Thus, a solid resin was obtained. The weight-average molecular weights of the solid resins thus obtained were determined. The results are shown in Table 11.

By using the recovered solid resins, acrylic powder coating compositions having the same compositions shown in Table 10 were prepared in the manner as described above. The powder coating compositions thus prepared were coated and baked in the manner as described in Example 1. The appearance of the resulting films was compared, with the naked eye, to the appearance of the respective original powder coating compositions. The results are shown in Table 11.

TABLE 11

| Excess Powder Coating Composition | H | I | J | K |
|---|---|---|---|---|
| Weight-Average M.W. of Resin Contained in Resin Solution | 20,000 | 19,000 | 26,000 | 29,000 |
| Weight-Average M.W. of Recovered Solid Resin | 21,000 | 20,000 | 27,000 | 30,000 |
| Appearance of Film*1 | identical | identical | similar | similar |

*1 Coating films obtained from the powder coating compositions containing the recovered resin solutions as compared with those obtained from the respective original powder coating compositions.

What we claim is:

1. A method for recovering an acrylic resin component from an excess of a sprayed powder coating composition containing acrylic resin, a pigment and a curing agent which is not deposited onto an article to be coated and is recovered in an apparatus for coating an article with a powder coating composition, comprising the steps of:
    (a) treating the excess powder coating composition with an aromatic hydrocarbon solvent, whereby the acrylic resin component is dissolved in the solvent which has a solubility for the curing agent of not more than 0.1 g curing agent per 100 g of solvent;
    (b) separating insoluble or non-dissolved components including the pigment and the curing agent from the resin solution obtained in step (a), and;
    (c) removing the solvent from the resin solution to thereby recover the acrylic resin component.

2. A method as claimed in claim 1, wherein said aromatic hydrocarbon solvent is toluene, xylene or a mixture thereof.

3. A method as claimed in claim 2, wherein the concentration of the resin component in the resin solution is within the range of from 10 to 30% by weight.

4. A method as claimed in claim 1, wherein said curing agent is at least one dicarboxylic acid.

5. A method as claimed in claim 1, wherein the aromatic hydrocarbon solvent is used in such an amount that the concentration of the resin component in the resin solution becomes at least 10% by weight.

* * * * *